(12) United States Patent
Nevarez

(10) Patent No.: US 8,502,124 B2
(45) Date of Patent: Aug. 6, 2013

(54) RECIPROCATING OSCILLATING CONVEYOR OVEN

(75) Inventor: Roberto Nevarez, Hudson, FL (US)

(73) Assignee: Enodis Corporation, New Port Richey, FL (US)

( * ) Notice: Subject to any disclaimer, the term of this patent is extended or adjusted under 35 U.S.C. 154(b) by 330 days.

(21) Appl. No.: 12/908,573

(22) Filed: Oct. 20, 2010

(65) Prior Publication Data
US 2011/0114634 A1     May 19, 2011

Related U.S. Application Data

(60) Provisional application No. 61/254,070, filed on Oct. 22, 2009.

(51) Int. Cl.
*H05B 6/80* (2006.01)
*H05B 6/78* (2006.01)
*A21B 1/48* (2006.01)

(52) U.S. Cl.
USPC ......... 219/725; 219/700; 126/19 R; 126/39 R

(58) Field of Classification Search
USPC ................. 219/725, 700–704, 392, 388, 679, 219/699, 741, 757; 126/39 R, 21 A, 133, 126/150 HC; 432/4; 426/19, 87, 503, 549
See application file for complete search history.

(56) References Cited

U.S. PATENT DOCUMENTS

| | | | |
|---|---|---|---|
| 4,687,119 A * | 8/1987 | Juillet | 221/101 |
| 4,997,365 A | 3/1991 | Lanham | 432/121 |
| 6,157,002 A | 12/2000 | Schjerven, Sr. et al. | 219/388 |
| 6,512,213 B2 | 1/2003 | Choi | 219/754 |
| 2004/0188430 A1* | 9/2004 | Qazi et al. | 219/700 |
| 2006/0254430 A1 | 11/2006 | Nevarez et al. | 99/349 |
| 2008/0067166 A1 | 3/2008 | Yoder et al. | 219/413 |

OTHER PUBLICATIONS

International Search Report mailed Dec. 10, 2010 in the corresponding International Application No. PCT/US2010/053400.

* cited by examiner

*Primary Examiner* — Quang Van
(74) *Attorney, Agent, or Firm* — Ohlandt, Greeley, Ruggiero & Perle, L.L.P.

(57) ABSTRACT

A conveyor oven having an oven chamber with a single opening by which a food product enters and exits on a conveyor belt that is reversibly driven to convey the food product in and out of the oven chamber in a reciprocating manner. Also, the food is conveyed to a cooking position in an oscillating range within the oven chamber and then moved back and forth in the cooking range in an oscillatory manner within the oscillating range so as to prevent burning that would otherwise occur if left stationary.

12 Claims, 3 Drawing Sheets

RECIPROCATING OSCILLATING CONVEYOR OVEN

RELATED APPLICATION

This application claims the benefit of U.S. Provisional Patent Application Ser. No. 61/254,070 filed on Oct. 22, 2009, the entire contents of which are incorporated herein by reference.

FIELD OF THE DISCLOSURE

This invention relates to an oven for cooking food. In particular, the invention relates to a conveyor oven with a reversibly driven conveyor belt.

BACKGROUND OF THE DISCLOSURE

Conveyor ovens are known in which a conveyor belt is disposed between an inlet and an outlet. The conveyor belt is driven in a single direction from the inlet toward the outlet. Food is placed on the conveyor outside the inlet and conveyed into the oven for cooking and out of the oven via the outlet. Ovens of this type (known as pass-through conveyor ovens) require a rather large footprint inasmuch as the food entry and exit areas each require space. However, space is limited in many cooking kitchens. In addition, pass-through conveyor ovens have limited orientation possibilities.

There is a need for a conveyor oven with a reduced footprint.

There is also a need for a conveyor oven with flexible orientations.

SUMMARY OF THE DISCLOSURE

A conveyor oven of the present invention comprises an oven chamber with a single opening by which food enters and exits the oven. The conveyor is driven in a reciprocating manner to convey food via the single opening into the oven chamber and out of the oven chamber. In another embodiment, the food is moved to a cooking position in the oven chamber. The conveyor belt is then driven in an oscillating manner inwardly and outwardly about the cooking position. The oscillating motion of the food about the cooking position prevents burning that would otherwise occur if the food were maintained stationary at the cooking position. The conveyor oven of the present invention has a small footprint and can be oriented with the oven back toward a wall.

A conveyor oven of the present disclosure comprises an oven chamber having a single opening. A conveyor comprises a conveyor belt that extends through the single opening so as to be disposed partly inside and partly outside the oven chamber. A controller controls the conveyor belt to move in a reciprocating manner to convey a food product inwardly and outwardly of the oven chamber via the single opening.

In accordance with another embodiment of the conveyor oven of the present disclosure, a sensing device is located to detect a presence of the food product on the conveyor belt.

In accordance with another embodiment of the conveyor oven of the present disclosure, the controller controls the conveyor belt to move outwardly in a slow mode in an absence of the food product on the conveyor belt, and to move inwardly in a faster mode in a presence of the food product on the conveyor belt.

In accordance with another embodiment of the conveyor oven of the present disclosure, a thermal device is controlled by the controller to provide thermal energy to cook the food product.

In accordance with another embodiment of the conveyor oven of the present disclosure, the thermal device is selected from the group consisting of: electrical resistance device, gas burner device, microwave device, infrared device, and any combination thereof.

In accordance with another embodiment of the conveyor oven of the present disclosure, the controller further controls the conveyor belt to move the food product back and forth within an oscillating range located within the oven chamber so as to prevent burning of the food product.

In accordance with another embodiment of the conveyor oven of the present disclosure, the controller controls the conveyor belt to move the food product inwardly to a cooking position located within the oscillating range.

In accordance with another embodiment of the conveyor oven of the present disclosure, a thermal device is controlled by the controller to deliver thermal energy to the food product within the oscillating range.

In accordance with the present disclosure a method of controlling a conveyor oven comprises:

moving a conveyor belt in a reciprocating manner through a single opening of an oven chamber of the conveyor oven to move a food product on the conveyor belt inwardly and outwardly of the oven chamber; and cooking the food product in the oven chamber.

In accordance with the present disclosure the method further comprises: moving the conveyor belt outwardly in a slow mode in an absence of the food product on the conveyor belt.

In accordance with the present disclosure the method further comprises: detecting a presence of the food product on the conveyor belt and then moving the conveyor belt inwardly in a faster mode.

In accordance with the present disclosure the method further comprises: further moving the conveyor belt to oscillate the food product back and forth within an oscillating range located within the oven chamber.

In accordance with the present disclosure the method further comprises: moving the conveyor belt to move the food product inwardly to a cooking position within the oscillating range.

In accordance with the present disclosure the method further comprises: delivering thermal energy to the food product within the oscillating range.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
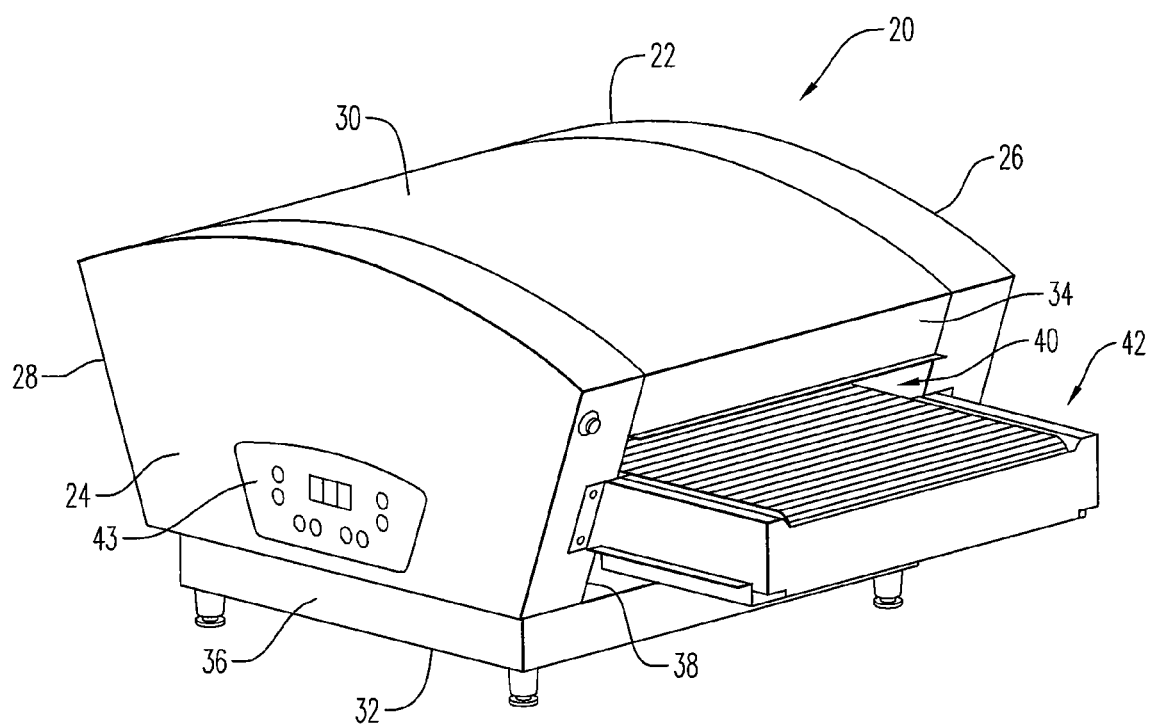
FIG. 1 is a perspective view of a conveyor oven of the present invention.

Referring to FIG. 1, a conveyor oven 20 of the present invention comprises a housing 22 that is secured to a base portion 36. Housing 22 includes side walls 24 and 26, a back wall 28, a top wall 30, a bottom wall 32 and a front wall 34. An oven chamber 40 is disposed within housing 22 and is supported by housing 22 and/or base portion 36. An opening 38 is disposed in front wall 34 and provides a point of entry and exit to and from oven chamber 40.

Housing 22 and/or base portion 36 provide support for a conveyor assembly 42 that is disposed partly in oven chamber 40 and partly outside oven chamber 40, extending through opening 38.

A control panel 43 is situated on side wall 24. In alternate embodiments, control panel 43 may be located in other places on housing 22. For example, control panel 43 may be located on front wall 34. Control panel 43 includes a display, a key entry pad, an ON/OFF switch and the like, none of which is shown on the drawing.

Figure 2:
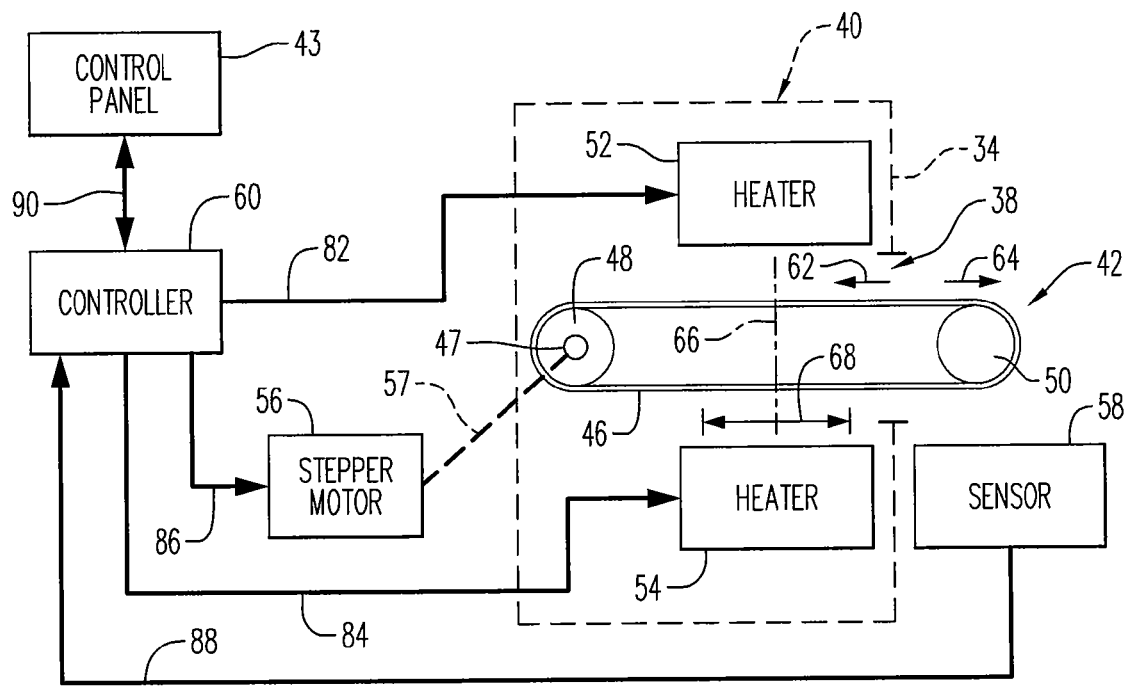
FIG. 2 is a block diagram in part and a schematic diagram in part of the cooking system of the conveyor oven of FIG. 1.

Referring to FIG. 2, conveyor assembly 42 is shown extending into oven chamber 40 via opening 38 of front wall 34. Conveyor assembly 42 comprises a conveyor belt 46 disposed about a drive wheel 48 and an idle wheel 50. An upper heating element 52 and a lower heating element 54 are disposed above and below conveyor belt 46, respectively, in oven chamber 40.

A stepper motor 56 is disposed in housing 22 and coupled as shown by dotted line 57 to a drive axle 47 of drive wheel 48. A sensor or detector device 58 is positioned to sense or detect a food product placed on conveyor belt 46 outside oven chamber 40. Generally, detector device 58 can be positioned at any suitable location that permits detection of food product interference. For example, the suitable locations include the top front, bottom front, either side of the front, middle front or other. Some detector devices may include multiple sensors.

Detector device 58 is preferably a proximity sensor, for example, model PRX+4400, available from Hermetic Switch, Inc. Alternative detector devices include a microswitch, for example, model E47BM530, available from Eaton/Culver Hammer. Other alternate detector devices include a touch sensor including dielectric sensing as well as piezo-electric pressure sensing. For example, the touch sensor may be model T107-A4E-073, available from Piezo Systems. Another detector device that can be used is a sonar sensor, for example, model EFR-RTQB40KS, available from Panasonic. Another alternate detector device includes an optical transmitter that transmits an optical beam of either visible light or invisible light (for example, infrared) and an optical receiver disposed to the front of cooking apparatus 20. A further alternate detector device includes a plurality of temperature sensors disposed at various locations in upper front outside oven chamber 40. The temperature sensor output signals are provided to a controller 60 for processing to determine the presence of a food product on the conveyor outside oven chamber 40. It will be apparent to those skilled in the art that detection circuitry may be provided to detect the presence of a food product based on the output signal(s) of the sensor(s).

Controller 60 is also located in housing 22. Controller 60 is operative to control stepper motor 56 to drive wheel 48 in either the clockwise direction or the counterclockwise direction. When drive wheel 48 is driven in the clockwise direction, conveyor belt moves outwardly of oven chamber 40 as shown by arrow 62. When drive wheel 48 is driven in the counterclockwise direction, conveyor belt moves inwardly of oven chamber 40 as shown by arrow 64.

Controller 60 also controls turning heaters 52 and 54 on and off to control the cooking of the food product. Controller 60 also receives the output of detector device 58 indicating a food product placed on conveyor belt 46 outside oven chamber 40. Controller 60 responds to the placement of a food product on conveyor belt 46 to operate stepper motor 56 so as to rotate drive wheel 48 in the counterclockwise direction and move conveyor belt 46 in the inward direction to a cooking position 66 located in-between upper heater 52 and lower heater 54. During cooking of the food product, controller 60 is operative to oscillate the food product back and forth inwardly and outwardly about cooking position 66 in an oscillating range 68.

Figure 3:
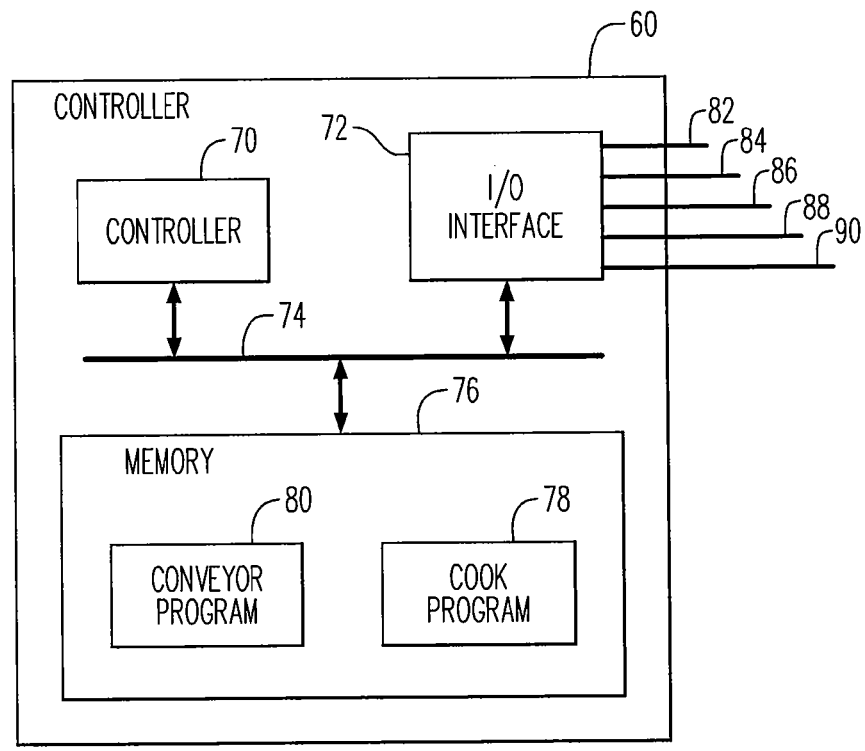
FIG. 3 is a block diagram of the controller of the cooking system of FIG. 2.

Referring to FIG. 3, controller 60 comprises a processor 70, an input/output (I/O) interface 72 and a memory 76 that are interconnected by a bus 74. A cooking program 78 and a conveyor program 80 are stored in memory 76. As shown in FIGS. 2 and 3, I/O interface 72 has connections 82, 84, 86, 88 and 90 to upper heater 52, lower heater 54, stepper motor 56, sensor 58 and control panel 43, respectively. Cooking program 78 comprises one or more cook procedures for cooking food products. These cook procedures may be downloaded from an external source (not shown) or entered manually from control panel 43 via connection 90, I/O interface 72 and bus 74 to memory 76 under control of processor 70. A user can also select from control panel 43 one of the cook procedures stored in memory 76 to cook a current food product. The external source, for example, may be a flash memory, a memory disk, a memory key, a remote server or other external source.

Conveyor program 80 includes a plurality of instructions, which when executed by processor 70 control the motion of conveyor belt 46, upper heater 52 and lower heater 54 to move the food product into oven chamber 40 via opening 38, to cook the food product and then return the food product via opening 38 to a location outside oven chamber 40.

Figure 4:
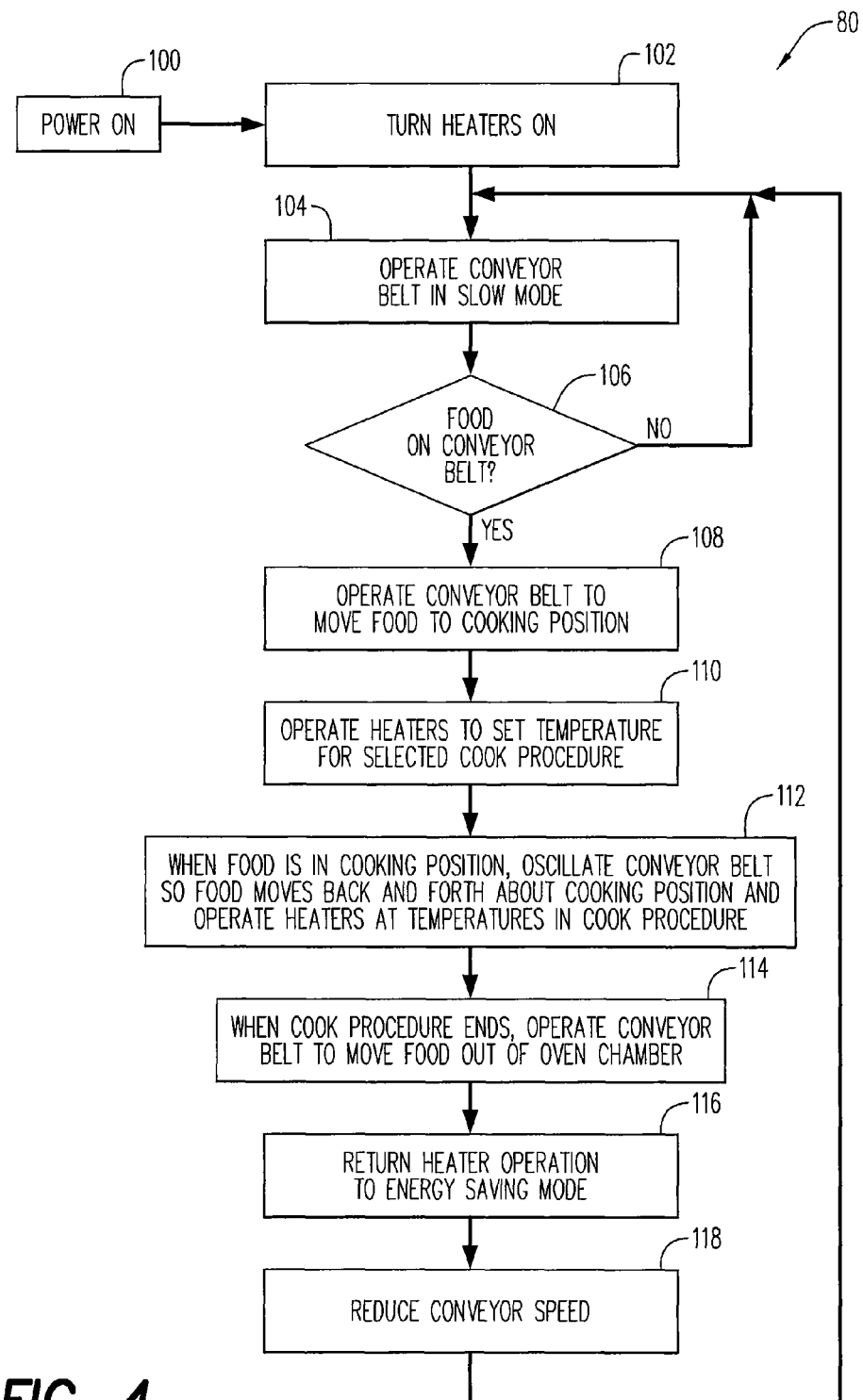
FIG. 4 is a flow diagram of the conveyor program of the controller of FIG. 3.

Referring to FIG. 4, conveyor program 80 begins at box 100 when the power is turned on for conveyor oven 20. At box 102, upper and lower heaters 52 and 54 are turned on. For example, the instructions may cause upper and lower heaters 52 and 54 to operate in an energy saving mode in which one of the heaters is turned off and the other heater is operated at a predetermined temperature below set temperature for cook procedures. For instance, upper heater 52 is turned off and lower heater 54 is operated to maintain the predetermined temperature below set temperature for cook procedures.

At box 104 the instructions cause processor 70 to control stepper motor 56 to move the conveyor belt slowly outward in a slow mode to prevent overheating of the conveyor.

At box 106 it is determined if a food has been placed on conveyor belt 46. If not, the operations of boxes 104 and 106 are repeated until the output of sensor 58 changes (or a button is manually operated) to indicate placement of a food product on conveyor belt 46. When this happens, the instruction(s) of box 108 cause conveyor belt 46 reverse its motion to move the food product inwardly to cooking position 66 inside oven chamber 40. At this point the speed of conveyor belt 46 is increased to a faster speed in a fast mode. Cooking position 66 is programmable and, thus can vary from one cook procedure to the next.

At box 110 upper and lower heaters 52 and 54 are operated at set temperatures that are contained in the cook procedure currently being run. At box 112 conveyor belt 46 is oscillated inwardly and outwardly so that the food product moves back and forth about cooking position 66 in oscillating range 68. Upper and lower heaters 52 and 54 are operated at the programmed temperatures of the cook procedure being run.

At box 114 when the cook procedure ends, conveyor belt 46 is operated at a faster speed to move the food product out of oven chamber 40. At box 116 upper and lower heaters 52 and 54 are operated so as to be returned to the energy saving mode temperature.

At box 118 the speed of conveyor belt 46 is reduced to a slow speed in the slow mode and control passes to box 104 and execution of the instructions of boxes 104 to 118 are repeated.

The present disclosure having been thus described with particular reference to the preferred forms thereof, it will be obvious that various changes and modifications may be made therein without departing from the spirit and scope of the present invention as defined in the appended claims.

What is claimed is:

1. A conveyor oven comprising:
   an oven chamber having a single opening;
   a conveyor comprising a conveyor belt that extends through said single opening so as to be disposed partly inside and partly outside said oven chamber; and
   a controller that controls said conveyor belt to move in a reciprocating manner to convey a food product inwardly and outwardly of said oven chamber via said single opening, wherein said controller controls said conveyor belt to move outwardly in a slow mode in an absence of said food product on said conveyor belt, and to move inwardly in a faster mode in a presence of said food product on said conveyor belt.

2. The conveyor oven of claim 1, further comprising a sensing device located to detect a presence of said food product on said conveyor belt.

3. The conveyor oven of claim 1, further comprising a thermal device that is controlled by said controller to provide thermal energy to cook said food product.

4. The conveyor oven of claim 3, wherein said thermal device is selected from the group consisting of: electrical resistance device, gas burner device, microwave device, infrared device, and any combination thereof.

5. A conveyor oven comprising:
   an oven chamber having a single opening;
   a conveyor comprising a conveyor belt that extends through said single opening so as to be disposed partly inside and partly outside said oven chamber; and
   a controller that controls said conveyor belt to move in a reciprocating manner to convey a food product inwardly and outwardly of said oven chamber via said single opening, wherein said controller further controls said conveyor belt to move said food product back and forth within an oscillating range located within said oven chamber so as to prevent burning of said food product.

6. The conveyor oven of claim 5, wherein said controller controls said conveyor belt to move said food product inwardly to a cooking position located within said oscillating range.

7. The conveyor oven of claim 5, further comprising a thermal device that is controlled by said controller to deliver thermal energy to said food product within said oscillating range.

8. A method of controlling a conveyor oven comprising:
   moving a conveyor belt in a reciprocating manner through a single opening of an oven chamber of said conveyor oven to move a food product on said conveyor belt inwardly and outwardly of said oven chamber via said single opening;
   cooking said food product in said oven chamber; and
   moving said conveyor belt outwardly in a slow mode in an absence of said food product on said conveyor belt.

9. The method of claim 8, further comprising:
   detecting a presence of said food product on said conveyor belt; and
   then moving said conveyor belt inwardly in a faster mode.

10. The method of claim 8, further comprising:
    delivering thermal energy to said food product within said oscillating range.

11. A method of controlling a conveyor oven comprising:
    moving a conveyor belt in a reciprocating manner through a single opening of an oven chamber of said conveyor oven to move a food product on said conveyor belt inwardly and outwardly of said oven chamber via said single opening;
    cooking said food product in said oven chamber; and
    further moving said conveyor belt to oscillate said food product back and forth within an oscillating range located within said oven chamber so as to prevent burning of said food product.

12. The method of claim 11, further comprising:
    moving said conveyor belt to move said food product inwardly to a cooking position within said oscillating range.

* * * * *